United States Patent [19]

Goodridge

[11] 4,077,790

[45] Mar. 7, 1978

[54] NOISE SUPPRESSOR FOR A ROW OF ROTARY FIBERIZERS

[75] Inventor: Paul A. Goodridge, Granville, Ohio

[73] Assignee: Owens-Corning Fiberglas Corporation, Toledo, Ohio

[21] Appl. No.: 801,200

[22] Filed: May 27, 1977

[51] Int. Cl.² ............................................. C03B 37/04
[52] U.S. Cl. ................................. 65/11 R; 65/14; 65/16; 156/62.4; 181/205; 264/12; 425/8
[58] Field of Search ............ 181/36 D, 33 K; 264/12; 65/4, 9, 5-8, 14-16, 11 R; 425/8; 156/62.4

[56] References Cited

U.S. PATENT DOCUMENTS

| | | | |
|---|---|---|---|
| 2,914,806 | 12/1959 | Long et al. | 65/11 R X |
| 3,346,356 | 10/1967 | Anderson et al. | 65/14 |
| 3,560,179 | 2/1971 | Kleist | 65/14 |
| 3,685,614 | 8/1972 | Coanda et al. | 181/33 HB X |
| 3,785,791 | 1/1974 | Perry | 65/16 X |
| 3,881,569 | 5/1975 | Evans | 181/33 K |

Primary Examiner—Robert L. Lindsay, Jr.
Attorney, Agent, or Firm—Ronald C. Hudgens; Philip R. Cloutier; Paul J. Rose

[57] ABSTRACT

The lower portions of the guard rings of a row of rotary fiberizing units are surrounded by an elongate rectangular noise suppressor having front and rear panels extending lengthwise of the row and transverse end panels connecting the front and rear panels. The panels have impervious sheet steel at their outer surfaces, but are provided with screens of expanded steel at their inner surfaces and are filled with a sound deadening material. Between each pair of adjacent fiberizing units a panel-like expanded steel basket full of sound deadening material is suspended immediately below the guard rings and connected to the front and rear panels. The front panel is segmented into removable doors enabling the fiberizer units to be moved out of the noise suppressor for inspection or repair.

6 Claims, 4 Drawing Figures

NOISE SUPPRESSOR FOR A ROW OF ROTARY FIBERIZERS

This invention relates generally to noise suppressors, and more particularly to a noise suppressor for a row of rotary fiberizing units used to produce fibrous glass and having noisy gaseous blast fiber attenuating means.

An object of the invention is to provide a noise suppressor for a row of rotary fiberizing units.

Another object is to provide a noise suppressor for a row of rotary fiberizing units, the noise suppressor having readily removable portions to enable fiberizing units to be moved transversely out therefrom for inspection or repair.

Other objects and advantages will become apparent when the following specification is considered along with the accompanying drawings in which.

Figure 1:
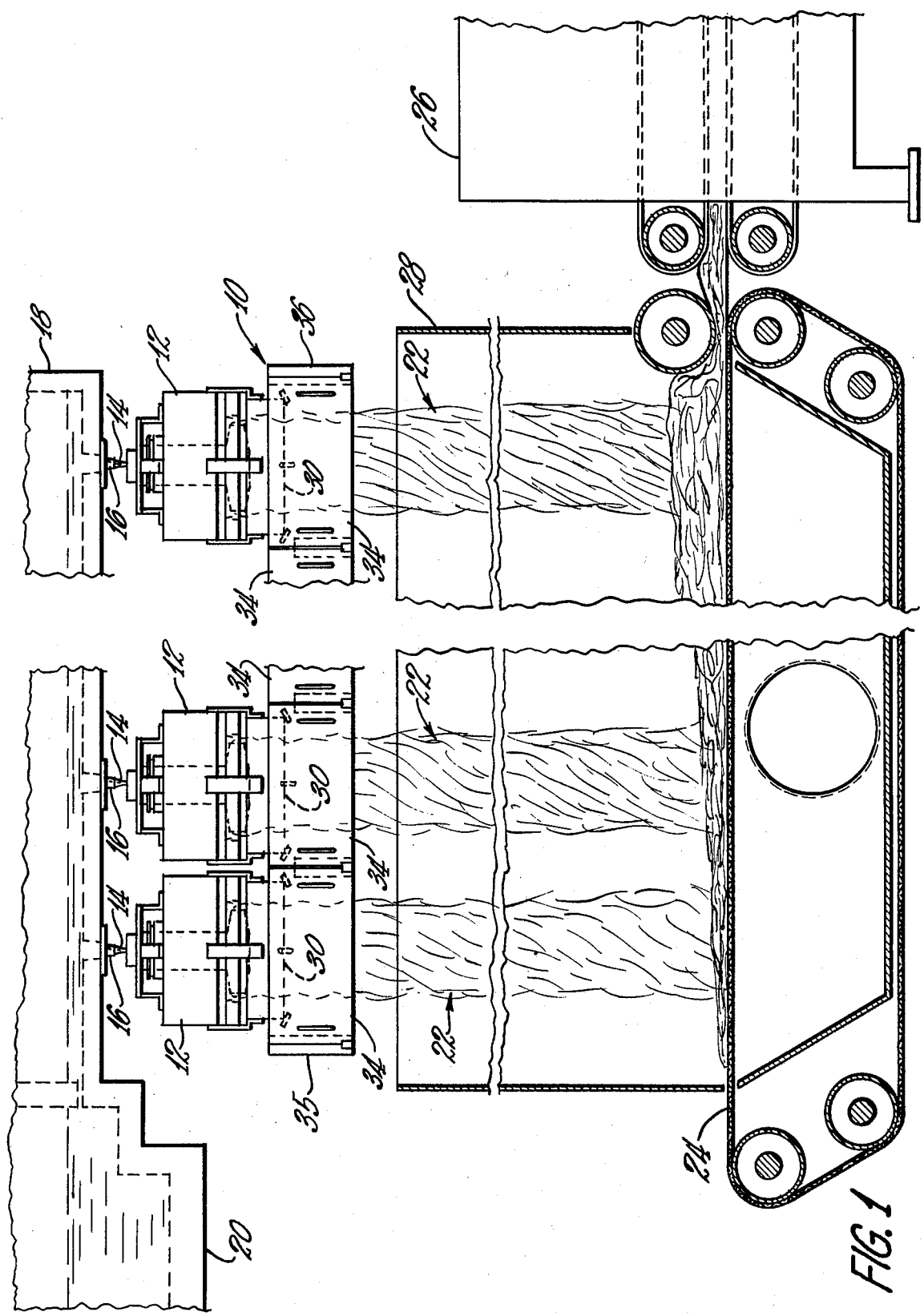
FIG. 1 is a fragmentary elevational view, partially in section, showing a melting furnace forehearth, a plurality of rotary fiberizing units, a forming hood, a collecting conveyor, a curing oven, and a noise suppressor constructed in accordance with the invention.

With reference to the drawings, FIG. 1 shows a noise suppressor 10, constructed in accordance with the invention, in use with a plurality of rotary fiberizing units 12 arranged in a row and constructed as disclosed in U.S. Pat. No. 3,560,179, issued Feb. 2, 1971, and incorporated herein by reference. The units 12 respectively receive a plurality of molten glass streams 14 from a plurality of stream feeders 16 in the bottom of a forehearth 18 of a glass batch melting furnace 20, and produce a plurality of veils 22 of discontinuous glass fibers which are collected on an endless belt conveyor 24 and fed to a curing oven 26 in which binder on the glass fibers is cured. The veils 22 are protected by a forming hood 28.

The fiberizing units 12 are supported by conventional structural frame means (not shown). At its lower end each unit 12 has a guard ring 30 surrounding a fiber attenuating zone provided with an annularly shaped, high velocity, noisy gaseous blast. The upper portion of the noise suppressor 10 overlaps lower portions of the guard rings 30 as shown in FIG. 1.

Figure 2:
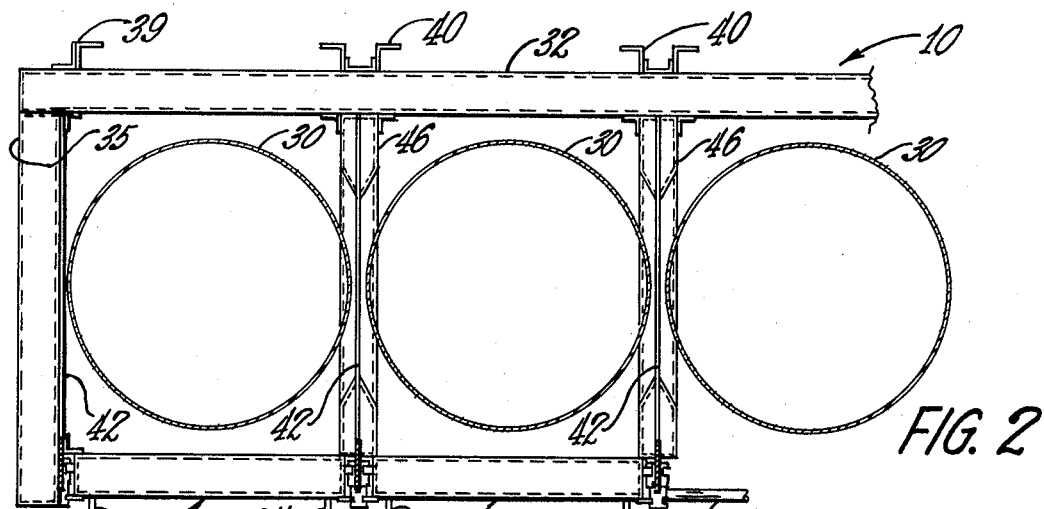
FIG. 2 is a fragmentary plan view of the noise suppressor of FIG. 1 showing the guard rings of several of the fiberizing units in section.
Figure 3:
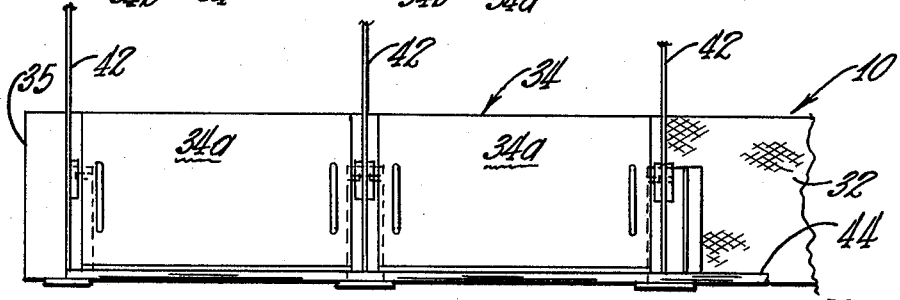
FIG. 3 is a fragmentary elevational view of the noise suppressor of FIG. 1.
Figure 4:
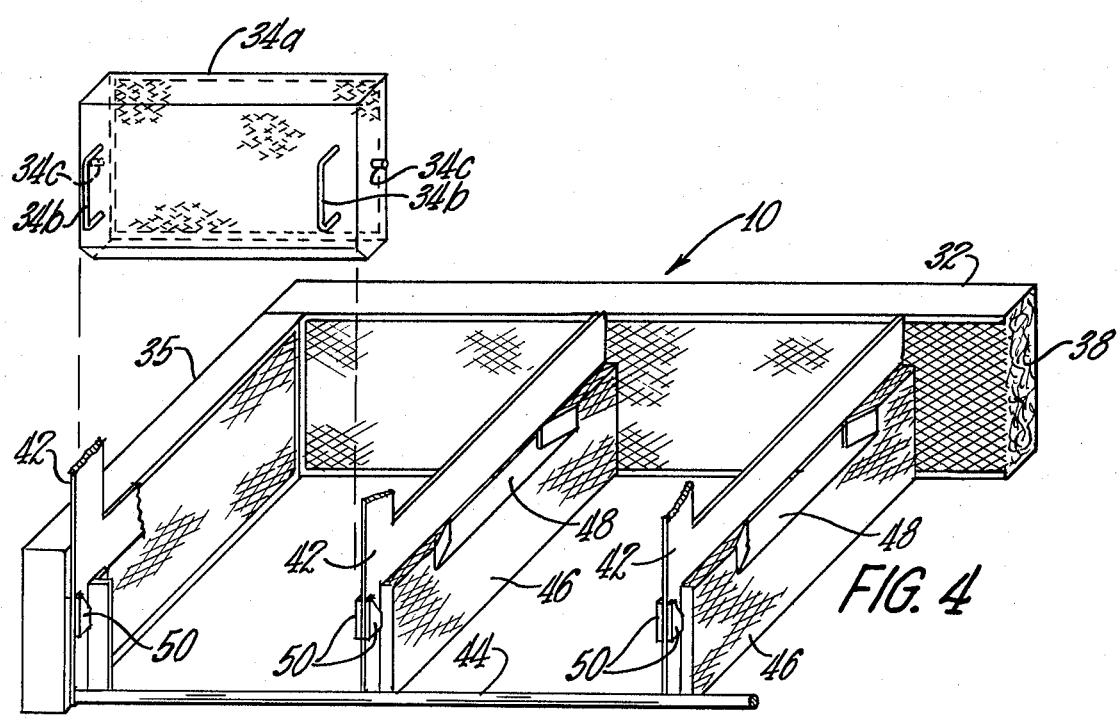
FIG. 4 is a fragmentary exploded perspective view of the noise suppressor of FIG. 1.

The noise suppressor 10 includes a rear panel 32 shown in FIGS. 2 to 4, a front panel 34, and two end panels 35 and 36. The rear panel 32 and the front panel 34 extend along the row of fiberizing units 12 respectively on opposite sides thereof. The front panel 34 is segmented into a plurality of removable doors 34a. On the sides facing away from the fiberizing units 12, the panels are provided with impervious sheet steel, while on the sides facing toward the fiberizing units, the panels are provided with screens of expanded sheet steel spaced from the impervious sheet, as best shown in FIG. 4. The panels are filled with a sound deadening material such as mineral wool 38 (FIG. 4) shown in the rear panel 32.

The rear panel 32 has a plurality of composite brackets 39 and 40 secured thereto for fastening to suitable support members (not shown). Additional support is provided by a framework including a plurality of flat T-shaped members 42 having trunk portions extending horizontally respectively between pairs of adjacent fiberizing units 12 and secured at their free ends in any suitable manner to the upper portion of the rear panel 32. The upper end portions of the vertically extending head portions of the T-shaped members 42 are secured to other suitable support members (not shown). The lower end portions of the head portions of the T-shaped members 42 are connected together by a support rod 44 for the doors 34a making up the front panel 34.

A plurality of panel-like baskets 46 are secured in a suitable manner at opposite ends respectively to the rear panel 32 and to the lower end portions of the head portions of the T-shaped members 42 immediately below the horizontally extending trunk portions thereof. The baskets 46 formed of screen-like expanded sheet steel, filled with a sound deadening material such as mineral wool, and shaped to provide a transverse opening 48 (FIG.4) under and partially defined by the trunk portions of their respective T-shaped members 42.

Each door 34a is provided with a pair of handles 34b and a pair oppositely extending pins 34c. Each pin 34c cooperates with a respective one of a plurality of cam plates 50 secured to the lower end portions of the head portions of the T-shaped members 42. The pins 34c, the cam plates 50, the rod 44, and the force of gravity hold the doors 34a in position.

The noise suppressor 10 has been found to reduce the noise of the gaseous fiber-attenuating blast at the fiberizing units 12 by several decibels.

Various modifications may be made in the structure shown and described without departing from the spirit and scope of the invention as set forth in the following claims.

I claim:

1. A noise suppressor in combination with a row of rotary fiberizing units having gaseous blast fiber attenuating means, comprising front and rear panels extending along the row of fiberizing units respectively on opposite sides thereof, a pair of end panels extending transversely of the row of fiberizing units, each end panel connecting an end portion of the front panel and a corresponding end portion of the rear panel, the front, rear, and end panels each having a pair of spaced inner and outer wall portions and a sound deadening material therebetween, and a plurality of panel-like baskets filled with sound deadening material and disposed respectively between pairs of adjacent fiberizing units.

2. A noise suppressor as claimed in claim 1 wherein the sound deadening material is mineral wool.

3. A noise suppressor as claimed in claim 1 wherein the front panel is segmented into a plurality of removable doors accommodating horizontal movement of fiberizing units outwardly of the suppressor.

4. A noise suppressor as claimed in claim 3 including a supporting framework comprising a plurality of flat T-shaped members having trunk portions extending horizontally respectively between pairs of adjacent fiberizing units with free ends secured to the upper portion of the rear panel and vertically extending head portions, the head portions of pairs of adjacent T-shaped members defining openings for the removable doors of the front panel.

5. A noise suppressor as claimed in claim 4 including a door supporting horizontal rod connected to the lower end portions of the vertically extending head portions of the T-shaped members.

6. A noise suppressor as claimed in claim 5 wherein each of the doors of the front panel includes a pair of oppositely extending pins and the lower end portions of the head portions of the T-shaped members are provided with cam plates cooperable respectively with the pins of the doors for holding the doors in place.

* * * * *